March 14, 1939.  L. F. BERG  2,150,756

COVER STRUCTURE

Filed Sept. 15, 1936

Inventor:
Leo F. Berg,
by Harry E. Dunham.
His Attorney.

Patented Mar. 14, 1939

2,150,756

UNITED STATES PATENT OFFICE 2,150,756

COVER STRUCTURE

Leo F. Berg, Chicago, Ill., assignor to Edison General Electric Company, Incorporated, Chicago, Ill., a corporation of New York Application September 15, 1936, Serial No. 100,866

8 Claims. (Cl. 220—24)

This invention relates to cover structures for closing openings in cabinets and the like, and it has for its object the provision of an improved device of this character which is simple and inexpensive in its construction, and which has a neat and clean-cut appearance.

While not limited thereto, this invention is particularly applicable to cabinets for electric water heaters and the like having normally closed openings which may be opened so that access can be had to electric switches, temperature control devices, etc. housed within the cabinet.

In accordance with this invention, the cover structure in one form thereof has a cover having a box section form. Seats are provided in the cabinet back of the opening for receiving the cover when it is inserted in the opening and arranged to position the cover so that when it is in its closed position, the exterior surface of the cover will be substantially flush with the exterior surface of the cabinet.

At one end of the opening, the cover has an interlocking connection with the cabinet preferably formed by a tongue and groove connection. At the opposite end, the casing is provided with a supporting plate having a screw which when turned inwardly is arranged to engage a stop plate on the cover. The supporting and stop plates are so arranged that when the screw is turned inwardly to engage the stop plate to support the cover, it also prevents movement of the cover from the opening.

The end of the cover where the supporting plate, stop plate and screw are located is provided with a part formed outwardly from the plane of the cover so as to define a hand grip. The hand grip is arranged to conceal these elements, and to provide an opening between its lower edge and the casing whereby access can be had to the screw.

In one form of this invention, the support functions to carry a bracket which projects through an aperture provided for it in the stop plate on the cover. The portion of the bracket which projects through is provided with an aperture through which a suitable sealing wire may be passed. The hand grip also functions to conceal the bracket and sealing wire.

Figure 1:
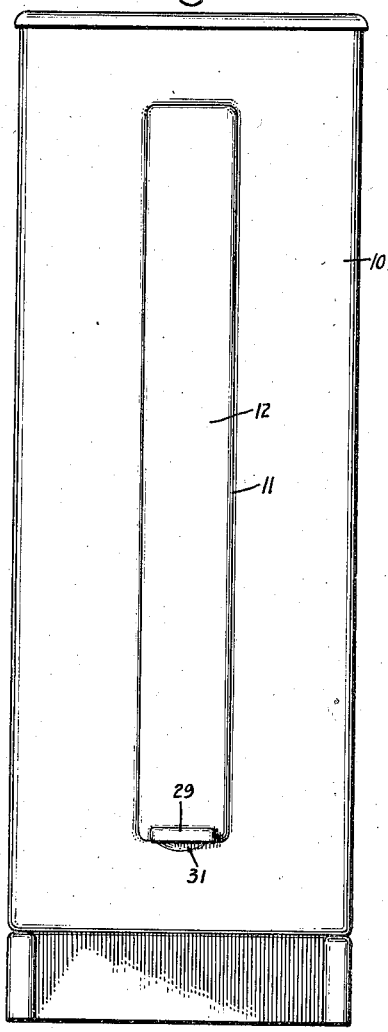
Figure 2:
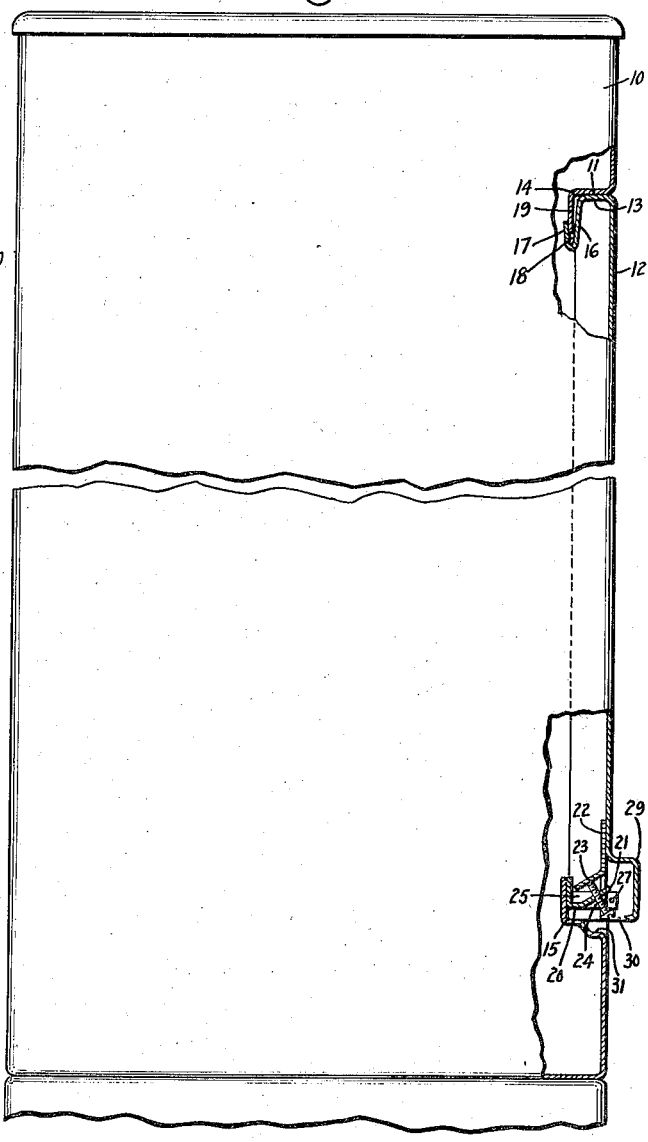
Figure 3:
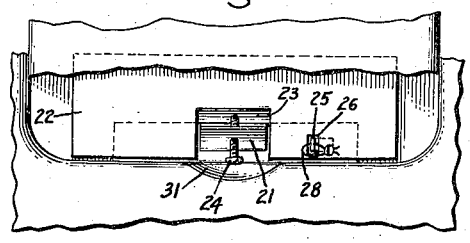

For a more complete understanding of this invention, reference should be had to the accompanying drawing in which Fig. 1 is a front elevation of an electric water heater having a cabinet provided with a cover structure arranged in accordance with this invention; Fig. 2 is an enlarged fragmentary side elevation of the heater of Fig. 1, parts being shown in section so as to illustrate certain details of construction; and Fig. 3 is an enlarged fragmentary view in front elevation illustrating a portion of the water heater of Figs. 1 and 2.

Referring to the drawing, this invention has been shown in one form as applied to an electric water heater having a cabinet or casing 10. It will be understood that the cabinet or casing 10 houses a suitable storage tank (not shown) and also suitable auxiliary equipment for the storage tank, such as switching mechanism, thermal controls, etc. (also not shown). The cabinet or casing 10, as shown, is of rectangular form. It is to be understood, however, that this invention is not limited to cabinets or casings of rectangular form, but is applicable equally as well to cabinets having other forms, such as cylindrical cabinets. Moreover, it is to be understood that while this invention is shown as applied to an electric water heater, it is applicable equally as well to other structures having openings which are normally closed by a removable cover.

The casing 10 is provided with a vertically arranged elongated opening 11 in its front wall which normally is closed by an elongated cover 12. The cover 12, as shown more clearly in Fig. 2, is provided with a peripheral flange 13 arranged at right angles to the plane of the cover so as to form a box section. The cabinet 10 at the upper and lower ends of the opening 11 are provided with seats 14 and 15 which receive the upper and lower edges of the cover 12 and which define the closed position of the cover so that when the cover is in this position, its outer surface is substantially flush with the outer surface of the front wall of the casing, as clearly shown in Fig. 2.

The inner edge of the upper portion of the flange 13 is provided with an extension 16 directed downwardly substantially at right angles to the flange, as shown in Fig. 2, and terminating in a return portion 17 folded back upon the portion 16 to define a channel 18. The channel 18 receives a tongue 19 which, as shown in Fig. 2, may conveniently be part of the seat 14. The channel 18 and tongue 19 form an interlocking connection for the cover at the top of the opening 11. The cover is applied to the opening 11 by moving it into and upwardly of the opening until the channel 18 receives the tongue 19.

Mounted on the lower seat 15 is a supporting plate 20, which is rigidly secured to the seat in any suitable manner, as by welding, and which has a portion 21 inclined upwardly toward the opening 11, as clearly shown in Fig. 2. Mounted upon the lower end of the cover is a stop plate 22 having a portion 23 extending inwardly of the opening 11 and inclined downwardly in substantially parallel spaced relation with the inclined part 21 of the supporting plate. Mounted in the supporting plate is a screw 24 adapted when turned inwardly to engage the inclined part 23 of the stop plate so as to secure the lower end of the door against downward and outward movement. It will be observed in view of the foregoing that when the screw 24 is turned inwardly to engage the inclined part 23, as shown in Fig. 2, it locks the lower end of the door against outward movement and also against downward movement. Thus, it also locks the upper end of the cover against withdrawal.

Certain utility companies, especially certain of those operating on a flat rate, desire that the cover be sealed to prevent the theft of electric current. The cover is sealed in accordance with this invention by means of a suitable bracket 25 which is rigidly secured to the seat 15 in any suitable manner, as by welding, and which projects outwardly through an aperture 26 provided for it in the stop plate 22. The outer end of the bracket is provided with an aperture 27 through which a suitable sealing wire 28 (Fig. 3) may be passed.

A suitable hand grip 29 is provided at the lower end of the cover 12. The hand grip 29 may be formed conveniently by pressing the stock of the cover 12 outwardly, as shown in Figs. 1 and 2, to form a handle of the desired shape. It will be observed that the elements securing the cover in place comprising the supporting plate 20, the stop plate 22 and the screw 24, as well as the sealing bracket 25 and wire 28 are all positioned behind the lower end portion of the cover which includes the handle or hand grip 29.

It will also be noted that a space 30 is left between the lower edge of the hand grip 29 and the casing through which access can be had to the screw 24 and to the sealing bracket 25. If desired, the seat 15 may be provided with a recessed portion 31 where it merges into the front wall of the cabinet to increase the width of the space 30.

It will be observed that I have provided a cover structure which is very neat and clean-cut in its appearance. When the cover is in its place in the opening 11, it is substantially flush with the front wall of the casing, thereby presenting a very neat appearance. It will also be observed that the tongue and groove arrangement 17, 18, 19 at the top and the securing means at the bottom of the cover structure are all concealed back of the cover. Moreover, the sealing bracket 25 and its wire 26 are concealed back of the cover.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States, is:

1. A cover structure for a member having a normally closed opening comprising a cover having at one end an interlocking connection with said member when inserted in said opening and moved into its closed position, and the cover having an uninterrupted closing wall that closes substantially the entire area of said opening when the cover is moved into said closed position, the end of the cover opposite said one end being provided with a relatively small area formed outwardly from the plane of the cover so as to provide a relatively small opening through which access can be had back of said cover, a support on said member back of said opening, a screw in said support accessible through said opening, and a stop plate on said cover arranged to be engaged by said screw when it is turned inwardly so that said cover is held by said screw in said interlocking relation with said member.

2. In combination with a casing provided with an elongated vertical opening whereby access may be had to the interior of said casing, an elongated cover for said opening having a groove at its upper end arranged to receive a tongue provided on said casing by movement of said cover into and upwardly of said opening, a cover support within said casing back of said opening at its lower end and secured to said casing, said support having a portion inclined upwardly toward said opening, a stop plate secured to said cover at its bottom above said inclined portion substantialy in parallel relation with it, a screw threaded in said inclined portion arranged when threaded in to engage said stop plate to hold said cover in its closed position and to prevent movement of said cover at the bottom and said cover having a plane uninterrupted closing wall that covers substantially the entire area of said opening when the cover is in its closed position, and having a relatively small area of its lower end formed outwardly from the plane of the cover to define a hand grip that conceals said support, stop plate and screw, and providing a relatively small opening with the lower edge of said casing through which access can be had to said screw.

3. A cover structure for a casing that is provided with an opening whereby access can be had to the interior thereof comprising a cover having a box section arranged to be fitted in said opening and a closing wall supported by the box section having a substantially plane uninterrupted closing surface, except for a relatively small protuberance at one end said casing having seats receiving said box section and defining the closed position for the cover in which position the outer surface of the closing wall is substantially flush with the walls of said casing a tongue and groove connection between said box section and said casing at the other end of the cover, a support on said casing at said one end of said cover, a stop plate on said one end of said cover overlapping said support and a screw mounted in said support and arranged when threaded in said stop plate to hold said cover against downward and outward movement; said protuberance formed of the material of which the wall is made and defining with the adjacent edge of said opening a relatively small opening through which access can be had to said screw.

4. A cover structure for a casing that is provided with an opening whereby access can be had to the interior thereof comprising a cover having a box section arranged to be fitted in said opening and said casing having seats receiving said cover and defining the closed position of said cover in which position the outer surface of said cover is substantially flush with the walls of said casing, a member defining a groove on an inner edge of said box section, a member in said casing defining a tongue received in said groove when said cover is in its closed position, a support on said casing opposite said tongue, a screw mounted in said support, and a stop plate on said cover lying adjacent said support, so that when said screw is threaded in it engages said stop plate to hold said cover against outward movement of said opening.

5. A cover structure for a casing that is provided with an opening whereby access can be had to the interior thereof comprising a cover arranged to close said opening having at one end an interlocking connection with said casing established by inserting said cover in said opening and moving it toward said end to a predetermined position, the cover having an uninterrupted closing wall to close substantially the entire area of said opening when the cover is mounted in said opening means at the end of said cover opposite said interlocking connection engaging the cover to hold it in its closed position manually movable into engagement with said cover and manually releasable therefrom to free said cover for movement from said opening and said cover having a portion formed outwardly from said cover to define a hand grip that is positioned to conceal said holding means and providing space between its outer edge and the adjacent edge of said casing whereby access can be had to said holding means to cause it to engage said cover and to release it therefrom.

6. A cover structure for a casing that is provided with an opening whereby access can be had to the interior thereof comprising a cover arranged to close said opening having at one end an interlocking connection with said casing established by inserting said cover in said opening and moving it toward said end to a predetermined position, means at the other end of said cover engaging the cover to hold it in its closed position manually movable into engagement with said cover and manually releasable therefrom to free said cover for movement from said opening, said cover having a portion formed outwardly from said cover to define a hand grip that is positioned to conceal said holding means and providing space between its outer edge and said casing whereby access can be had to said holding means to cause it to engage said cover and to release it therefrom, a bracket mounted on said casing projecting through an aperture in said cover below said hand grip, and said bracket being provided with an aperture in the projecting part adapted to receive a sealing wire.

7. A cover structure for a casing provided with an elongated vertical opening whereby access may be had to the interior of said casing comprising an elongated cover for said opening having a groove at its upper end arranged to receive a tongue provided on said casing by movement of said cover into and upwardly of said opening, a cover support within said casing back of said opening at its lower end and secured to said casing, said support having a portion inclined upwardly toward said opening, a stop plate secured to said cover at its bottom above said inclined portion substantially in parallel relation with it, a screw threaded in said inclined portion arranged when threaded in to engage said stop plate to hold said cover in its closed position and to prevent movement of said cover at the bottom, said cover having a part of its lower end formed outwardly from the plane of the cover to define a hand grip that conceals said support, stop plate and screw and providing an opening between its lower edge and said casing through which access can be had to said screw and a bracket secured to said support and projecting through a part of said stop plate so as to be accessible below said hand grip, the projecting portion having an aperture therein adapted to receive a sealing wire.

8. A cover structure for a vertical casing that is provided with a vertically arranged opening whereby access can be had to the interior thereof comprising a cover structure for said opening comprising a cover having a box section arranged to be fitted in said opening and said casing having seats at its upper and lower ends receiving said cover and defining the closed position thereof, in which position the outer surface of said cover is substantially flush with the outer surface of said casing, a tongue and groove connection between said cover and said casing at said upper end of said cover, a cover support rigidly secured to said seat at the lower end behind said opening and having a part inclined upwardly toward said opening, a stop plate secured to said cover at its bottom having a portion above said inclined part in substantially parallel relation with it, a screw threaded in said inclined part arranged when threaded in to engage said inclined portion of said stop plate to hold said cover in its closed position, a bracket secured to said support projecting through an aperture in said stop plate, said projecting portion having an aperture therein adapted to receive a sealing wire, said cover having a part at its lower end formed outwardly from the plane of the cover to define a hand grip that conceals said support, stop plate screw and bracket, and providing an opening between its lower edge and said casing through which access can be had to said screw and bracket.

LEO F. BERG.

CERTIFICATE OF CORRECTION.

Patent No. 2,150,756.　　　　　　　　　　　　　March 14, 1939.

LEO F. BERG.

It is hereby certified that error appears in the printed specification of the above numbered patent requiring correction as follows: Page 2, second column, line 21-22, claim 2, for "substantialy" read substantially; line 39, claim 3, for the syllable "open-" read opening; line 43, same claim, after "end" insert a comma; line 47, same claim 3, after "casing" insert a comma; page 3, first column, line 18, claim 5, after "opening" insert a comma; and second column, line 16, claim 7, after "screw" insert a comma; line 51, claim 8, after "plate" insert a comma; and that the said Letters Patent should be read with this correction therein that the same may conform to the record of the case in the Patent Office.

Signed and sealed this 25th day of April, A. D. 1939.

Henry Van Arsdale
Acting Commissioner of Patents.

(Seal)